US012611777B2

(12) United States Patent
Taylor et al.

(10) Patent No.: US 12,611,777 B2
(45) Date of Patent: Apr. 28, 2026

(54) ROBOTIC SYSTEM FOR REMOTE OPERATION OF EQUIPMENT IN INFECTIOUS ENVIRONMENTS

(71) Applicants: The Johns Hopkins University, Baltimore, MD (US); University of Maryland, College Park, MD (US)

(72) Inventors: Russell H. Taylor, Baltimore, MD (US); Axel Krieger, Baltimore, MD (US); Peter Kazanzides, Baltimore, MD (US); Balazs Vagcolgyi, Baltimore, MD (US); Anton Deguet, Baltimore, MD (US); Mikhail Khrenov, North Potomac, MD (US)

(73) Assignees: The Johns Hopkins University, Baltimore, MD (US); University of Maryland, College Park, College Park (MD)

( * ) Notice: Subject to any disclaimer, the term of this patent is extended or adjusted under 35 U.S.C. 154(b) by 171 days.

(21) Appl. No.: 18/019,039

(22) PCT Filed: Aug. 2, 2021

(86) PCT No.: PCT/US2021/044196
§ 371 (c)(1),
(2) Date: Jan. 31, 2023

(87) PCT Pub. No.: WO2022/026953
PCT Pub. Date: Feb. 3, 2022

(65) Prior Publication Data
US 2023/0278222 A1 Sep. 7, 2023

Related U.S. Application Data

(60) Provisional application No. 63/059,836, filed on Jul. 31, 2020.

(51) Int. Cl.
| | | |
|---|---|---|
| B25J 9/00 | (2006.01) | |
| B25J 9/16 | (2006.01) | |
| B25J 13/06 | (2006.01) | |

(52) U.S. Cl.
CPC ........... B25J 9/1689 (2013.01); B25J 9/1697 (2013.01); B25J 13/06 (2013.01)

(58) Field of Classification Search
CPC ........ B25J 9/1689; B25J 9/1697; B25J 13/06; B25J 19/023; B25J 11/00; G05B 2219/40195
See application file for complete search history.

(56) References Cited

U.S. PATENT DOCUMENTS

| | | | |
|---|---|---|---|
| 8,849,680 B2 * | 9/2014 | Wright ................... | H04N 7/185 705/2 |
| 9,283,675 B2 * | 3/2016 | Hager .................... | A61B 34/37 |

(Continued)

FOREIGN PATENT DOCUMENTS

| | | | |
|---|---|---|---|
| CN | 102692911 B | * 10/2014 | |
| CN | 110142265 A | * 8/2019 | ............... A61L 2/18 |

(Continued)

OTHER PUBLICATIONS

B. Gholami, W. M. Haddad and J. M. Bailey, "AI in the ICU: In the intensive care unit, artificial intelligence can keep watch," in IEEE Spectrum, vol. 55, No. 10, pp. 31-35, Oct. 2018 (Year: 2018).*

(Continued)

*Primary Examiner* — Ramon A. Mercado
*Assistant Examiner* — Shaheda Shabnam Hoque
(74) *Attorney, Agent, or Firm* — Venable LLP; Ryan Ward

(57) ABSTRACT
A robotic system for remote operation of human-controllable equipment includes a remotely operable robotic subsystem configured to be at least one of mounted on or (Continued)

arranged adjacent to the human-controllable equipment to be controlled, and a remote controller that is configured to be operated by a human. The remote controller emulates a control representation of the human-controllable equipment such that a human can provide commands using the control representation. The remotely operable robotic subsystem is configured to receive commands from the remote controller to thereby operate the human-controllable equipment.

13 Claims, 6 Drawing Sheets

(56)                 References Cited

U.S. PATENT DOCUMENTS

| | | | | |
|---|---|---|---|---|
| 9,669,543 | B1 * | 6/2017 | Stubbs | B25J 9/1612 |
| 10,471,588 | B2 * | 11/2019 | Wright | B25J 19/023 |
| 10,603,792 | B2 * | 3/2020 | Lai | B25J 9/1676 |
| 10,857,679 | B1 * | 12/2020 | Cousins | G05D 1/0246 |
| 11,648,687 | B2 * | 5/2023 | Linnell | G06F 3/04886 |
| | | | | 700/264 |
| 11,904,475 | B2 * | 2/2024 | Liu | B25J 9/161 |
| 12,099,357 | B1 * | 9/2024 | Ebrahimi Afrouzi | |
| | | | | G06V 40/197 |
| 2002/0105623 | A1 * | 8/2002 | Pinhanez | H04N 5/74 |
| | | | | 353/69 |
| 2004/0019406 | A1 | 1/2004 | Wang et al. | |
| 2012/0146956 | A1 * | 6/2012 | Jenkinson | G06F 3/0418 |
| | | | | 901/14 |
| 2015/0057804 | A1 * | 2/2015 | Som | G05B 19/409 |
| | | | | 700/264 |
| 2015/0331415 | A1 | 11/2015 | Feniello et al. | |
| 2016/0346936 | A1 | 12/2016 | Hietmann | |
| 2017/0273573 | A1 * | 9/2017 | Tusman | A61B 5/0836 |
| 2017/0355080 | A1 * | 12/2017 | Podnar | B25J 19/023 |
| 2018/0243922 | A1 * | 8/2018 | Hashimoto | B25J 9/0081 |
| 2018/0311825 | A1 | 11/2018 | Yamamoto et al. | |
| 2019/0163618 | A1 * | 5/2019 | Akiona | G06Q 10/06 |
| 2019/0167370 | A1 * | 6/2019 | Olson | A61B 34/76 |
| 2019/0210229 | A1 * | 7/2019 | Linnell | G06F 3/016 |
| 2020/0016335 | A1 * | 1/2020 | DiPerna | G16H 40/63 |
| 2020/0276707 | A1 * | 9/2020 | Go | B25J 9/1689 |
| 2021/0291385 | A1 * | 9/2021 | Mathews | A63H 33/26 |

FOREIGN PATENT DOCUMENTS

| | | | | | |
|---|---|---|---|---|---|
| CN | 111645075 | A | * | 9/2020 | A61L 2/10 |
| CN | 109702756 | B | * | 11/2023 | |
| CN | 110561414 | B | * | 2/2024 | B25J 9/1602 |
| DE | 102014202033 | A1 | * | 8/2015 | A61G 1/0275 |
| DE | 102018109304 | A1 | * | 10/2018 | B25J 13/00 |
| DE | 102015209899 | B4 | * | 6/2019 | B25J 13/006 |
| EP | 3098034 | A1 | * | 11/2016 | B25J 13/006 |
| JP | 2006508806 | A | * | 3/2006 | G16H 40/67 |
| JP | 2006524578 | A | * | 11/2006 | A61B 34/35 |
| JP | 6526098 | B2 | * | 6/2019 | B25J 13/00 |
| KR | 2015-0331415 | A1 | | 11/2015 | |
| KR | 20190110653 | A | * | 9/2019 | B25J 9/0087 |
| TW | 201707895 | A | * | 3/2017 | B25J 9/0087 |
| WO | WO-2014180501 | A1 | * | 11/2014 | G05B 19/0428 |
| WO | WO-2019079939 | A1 | * | 5/2019 | G01R 31/00 |

OTHER PUBLICATIONS

J. P. Desai, J. Sheng, S. S. Cheng, X. Wang, N. J. Deaton and N. Rahman, "Toward Patient-Specific 3D-Printed Robotic Systems for Surgical Interventions," in IEEE Transactions on Medical Robotics and Bionics, vol. 1, No. 2, pp. 77-87, May 2019 (Year: 2019).*

* cited by examiner

Outside ICU network

Infusion
pump

Inside ICU

Ventilator

Pressing button here
causes robot to press
button here or here

ROBOTIC SYSTEM FOR REMOTE OPERATION OF EQUIPMENT IN INFECTIOUS ENVIRONMENTS

CROSS-REFERENCE TO RELATED APPLICATIONS

The present patent application is a U.S. National Stage of PCT/US2021/044196, filed Aug. 2, 2021, which claims priority benefit to U.S. Provisional Patent Application No. 63/059,836, filed on Jul. 31, 2020, the entire contents of which are incorporated herein by reference. All references cited anywhere in this specification, including the Background and Detailed Description sections, are incorporated by reference as if each had been individually incorporated.

BACKGROUND

1. Technical Field

The presently claimed embodiments of the current invention relate to robotic systems, and more particularly to robotic systems for remote operation of human-controllable equipment.

2. Discussion of Related Art

The recent coronavirus pandemic has placed a severe burden on our entire health care system. In particular, there has been a major surge in the need for patient support in intensive care units, where patients are often placed on ventilators, infusion pumps, and other support equipment. Since an ICU with an infected patient is itself an infectious environment, clinical care personnel must don personal protective equipment (PPE) each time they enter the room, even to make minor adjustments to equipment, and must take it off and either discard or decontaminate it when they leave. Not only does this greatly increase the need for PPE, which may be in short supply, it also takes considerable time, thus negatively affecting the efficiency of already over-burdened personnel.

Ideally, all ICU equipment might be interfaced to computer networks and operated remotely from a central control station, so that ICU personnel would only need to enter the room for tasks that require direct patient contact. Unfortunately, the vast majority of current ICU equipment does not have this capability. Even if such equipment were available on the marketplace, together with the necessary support infrastructure, it would be many years before it would be universally deployed. Consequently, there is a significant need for simple systems that can operate existing legacy equipment remotely. Further, it is highly desirable that the method of remote operation be intuitively simple and familiar to personnel who are familiar with operating the equipment using its standard interfaces, which typically consist of push buttons, touch screens, and knobs that can be turned, together with displays showing the current state and settings of the equipment.

Further, it is readily apparent that the need for such remote operation capabilities is not limited to one single disease outbreak, such as covid-19. It is a general need that is associated with any cases where clinical care personnel must enter an infectious environment to make routine adjustments to equipment.

SUMMARY

A robotic system for remote operation of human-controllable equipment according to some embodiments of the current invention includes a remotely operable robotic subsystem configured to be at least one of mounted on or arranged adjacent to the human-controllable equipment to be controlled, and a remote controller that is configured to be operated by a human. The remote controller emulates a control representation of the human-controllable equipment such that a human can provide commands using the control representation. The remotely operable robotic subsystem is configured to receive commands from the remote controller to thereby operate the human-controllable equipment.

A method for remote operation of human-controllable equipment according to some embodiments of the current invention includes at least one of mounting a remotely operable robotic subsystem on the human-controllable equipment or arranging the remotely operable robotic subsystem adjacent to the human-controllable equipment, and providing a remote controller that is configured to be operated by a human. The remote controller emulates a control representation of the human-controllable equipment such that a human can provide commands using the control representation, and the remotely operable robotic subsystem is configured to receive commands from the remote controller to thereby operate the human-controllable equipment.

BRIEF DESCRIPTION OF THE DRAWINGS

Embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

DETAILED DESCRIPTION

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed, and other methods developed, without departing from the broad concepts of the present invention. All references cited anywhere in this specification are incorporated by reference as if each had been individually incorporated.

Figure 1:
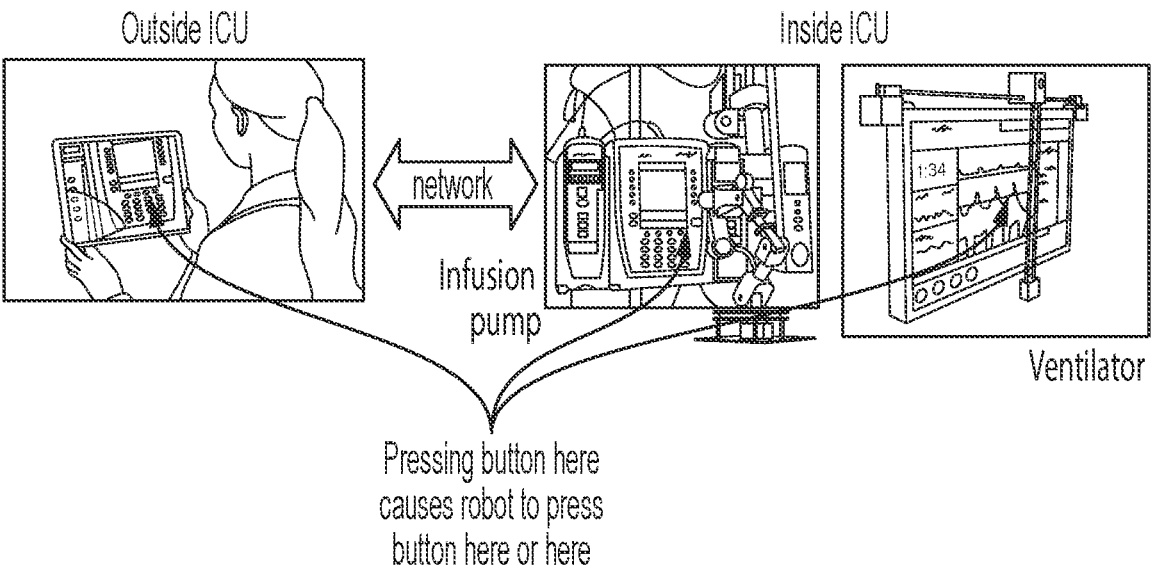
FIG. 1 is a schematic illustration of a robotic system for remote operation of human-controllable equipment according to an embodiment of the current invention.

FIG. 1 is a schematic illustration of a robotic system for remote operation of human-controllable equipment according to an embodiment of the current invention. The system comprises two components: (1) a remotely operated robotic subsystem mounted on or adjacent to the equipment to be controlled (righthand side of FIG. 1), and (2) a remote controller that is operated by a human (righthand side of FIG. 1). For example, the equipment to be controlled can be a medical device such as, but not limited to, a ventilator or an infusion pump. The equipment to be controlled is also referred to herein as human-operable equipment. The two modules communicate with each other (for example wirelessly) using a safe and secure method, which enables the operator to control the device using the remote controller from a distance, even if the two modules are separated by a physical barrier, such as a wall or window.

Figure 2:
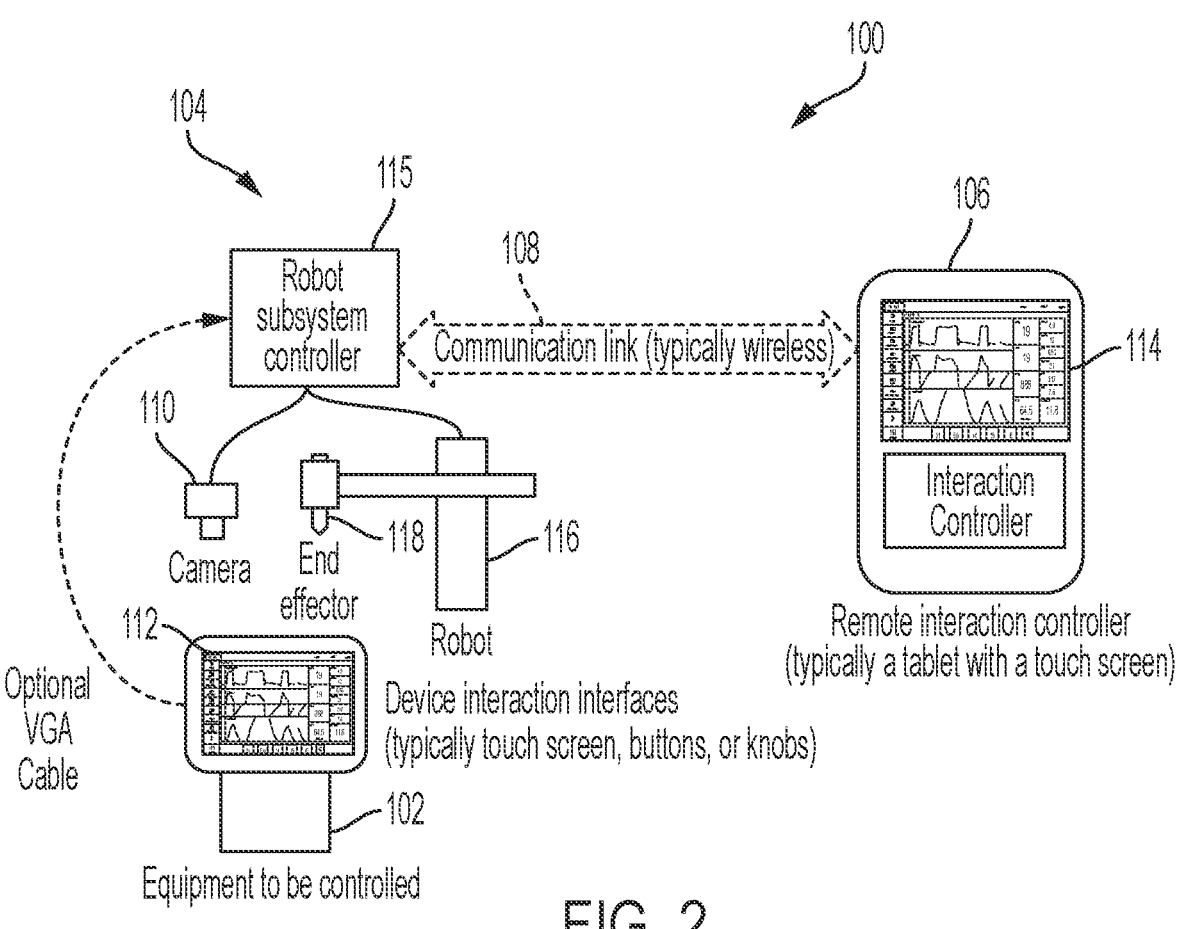
FIG. 2 is a schematic illustration of a particular example of a robotic system for remote operation of human-controllable equipment according to an embodiment of the current invention.

FIG. 2 is a schematic illustration of a robotic system 100 for remote operation of human-controllable equipment 102 according to an embodiment of the current invention. The robotic system 100 includes a remotely operable robotic subsystem 104 configured to be at least one of mounted on or arranged adjacent to the human-controllable equipment 102 to be controlled. The robotic system 100 also includes a remote controller 106 that is configured to be operated by a human. The remote controller 106 emulates a control representation of the human-controllable equipment 102 such that a human can provide commands using the control representation. The remotely operable robotic subsystem 104 is configured to receive commands 108 from said remote controller 106 to thereby operate the human-controllable equipment 102.

The remote robotic subsystem 104 can be equipped with a camera 110 that is aimed at the control panel 112 of the device 102 and sends the live video of the control panel 112 to the remote controller 106. When the remote controller 106 receives these video frames, it first transforms them in a way that the device's control panel 112 appears from a front-view perspective (de-warped) then displays these front-view images on its screen 114 for the operator. Alternatively, or additionally, if the equipment to be controlled provides a VGA, HDMI, or other cable supporting an external display, then this cable may also be provided to the robotic subsystem controller 115 for transmission to the remote controller 106.

The robotic subsystem controller software can include computer vision methods to automatically localize the control panel 112 of the device and to detect the location of the robot's 116 end-effector 118 in the video frames taken with the camera 110. In some embodiments, an LED or other marker may be placed on the end effector 118 or other part of the robot's structure 116 to facilitate detection and tracking of the end effector 118. These algorithms enable the system to map pixel coordinates on the de-warped front-view images to robot joint positions (robot-to-screen calibration).

The robot's end effector 118 has appropriate mechanisms to perform a control action on the equipment to be controlled, similar to what a human interacting directly with the equipment would do. In the simplest case, this would be a simple mechanism to press a button or touch a point on a touch screen display. In other cases, this might include a mechanism to grasp and rotate a knob or to execute a two degree-of-freedom action combining turning a knob and depressing it to perform a "select" action. In other embodiments, the knob turning/depressing motion could be implemented by a separate small robotic device that could be mounted on the equipment to be controlled 102 and actuated under control of the robot subsystem controller 115.

The system provides methods to measure the offset between the detected end-effector position on the video frames and the position where the robot's pointer touches the control panel. This offset calibration process is done offline using a calibration device and results in an offset map for the entire control panel.

The system can be capable of measuring mechanical robot positioning inaccuracies by using the computer vision-based end-effector localization method and correct these errors using a visual servoing algorithm.

The screen localization, robot-to-screen calibration, offset calibration, and visual servoing methods enable the remote controller to robustly determine commands (e.g., robot joint position commands) that can be sent to the robotic subsystem to cause the robot to move the end effector 118 to any desired position on the control panel 112 of the equipment to be controlled 102.

To interact with the equipment to be controlled 102, the operator selects a position on the equipment's control panel 112 by selecting the corresponding position on the live image display on the remote interface 114. This is also referred to as an emulation of a control representation of the human-controllable equipment 102. The remote controller 106 then computes and transmits the appropriate motions to move the robot subsystem's end effector 118 to the desired position relative to the equipment's control panel 112. The operator can actuate the selected control, such as a button or a knob on the device using a graphical user interface or other input device on the remote controller 106.

Although secure wireless communication can be a good method for communication between the robot subsystem 104 and the remote controller 106 in some embodiments, any suitable method may be substituted provided that it has sufficient bandwidth. In some embodiments, for example, it may be suitable to use a dedicated wired connection or a wired local internet connection.

If the robotic device is to be mounted to equipment in a contaminated environment, it may be useful to provide methods that facilitate disinfection of the equipment and the robot when it is removed from one setting for storage or transfer to another piece of equipment. For example, simple disposable barriers may be placed between the clamping devices used to attach the robot to the equipment and the equipment itself. Similarly, the end-effector or other parts of the robot may be designed with removable components to facilitate disinfection, or these components may be produced as single-use, disposable components.

Figure 3:
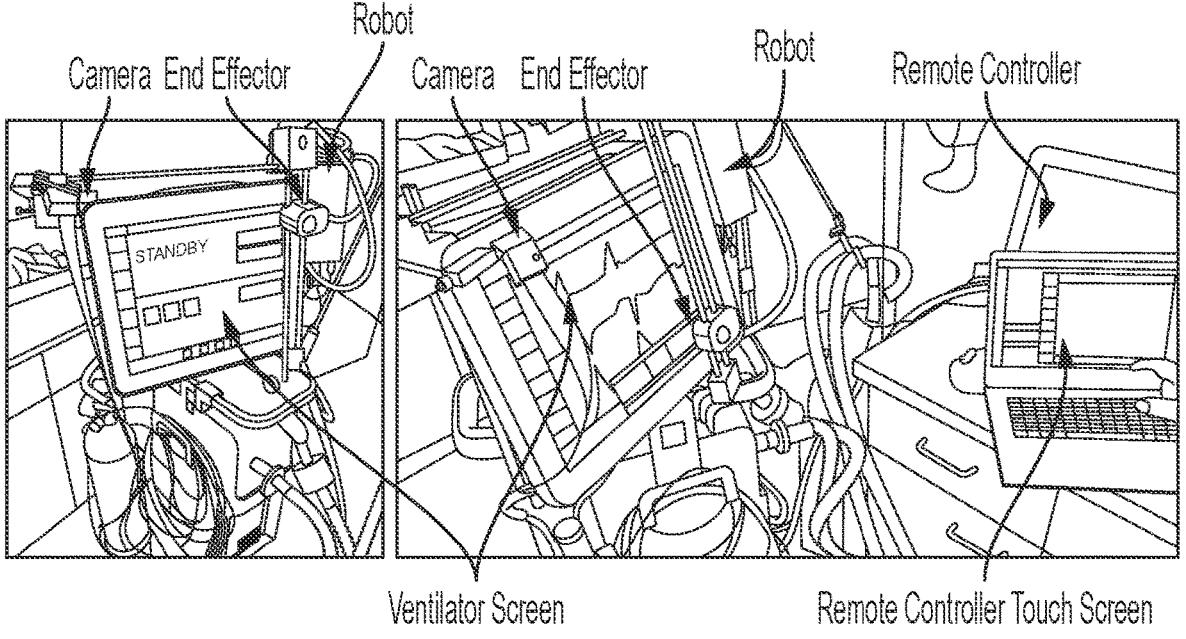
FIG. 3 shows an embodiment with cartesian robot and ventilator with a touch-screen operator interface.
Figure 4:
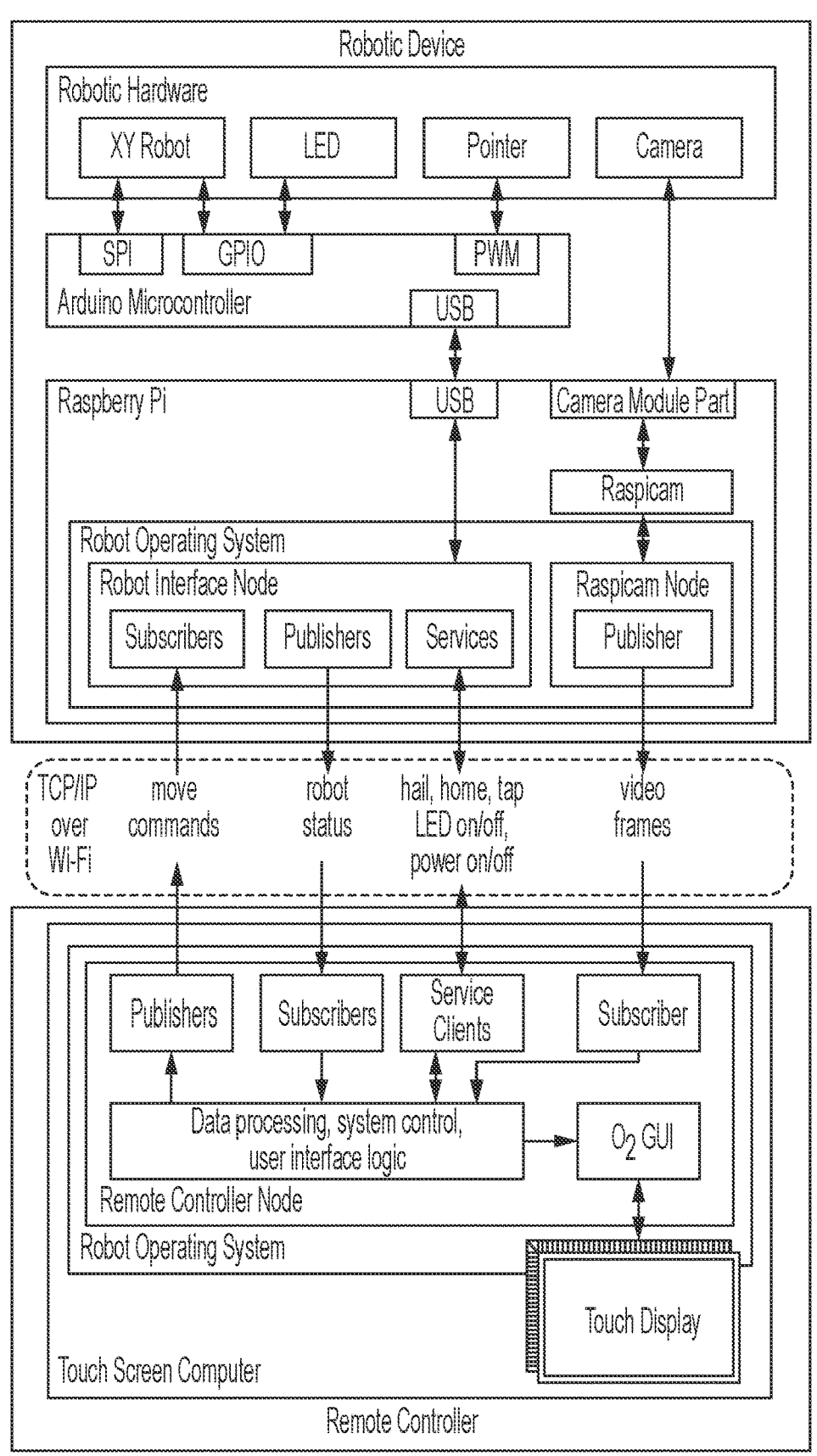
FIG. 4 is a software block diagram for the embodiment shown in FIG. 3.
Figure 5:
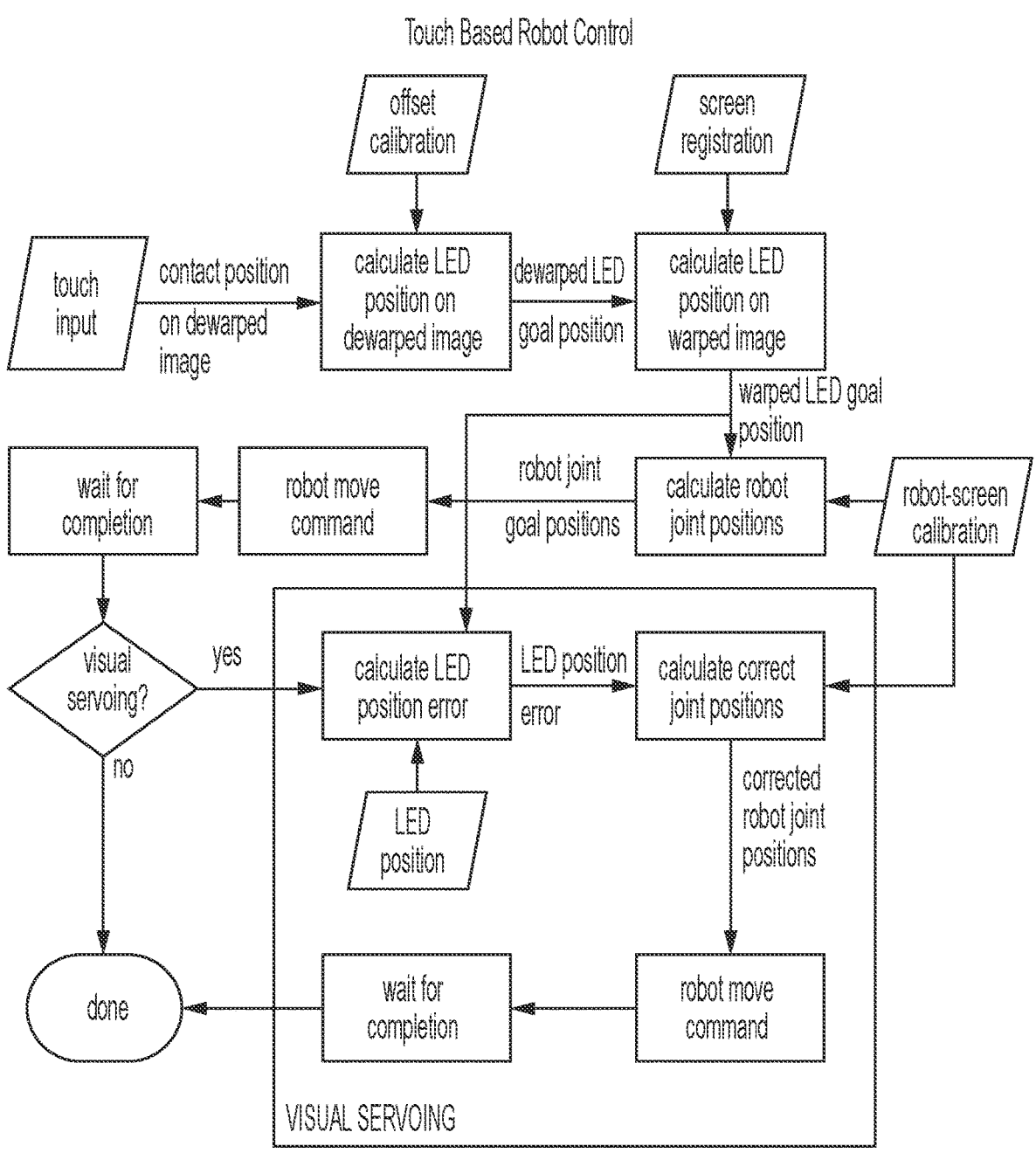
FIG. 5 shows logic for touch-based robot control according to an embodiment of the current invention.

An embodiment of this architecture is shown in FIG. 3, and a block diagram of the system control architecture is shown in FIG. 4 and the logic for touch-based robot control is shown in FIG. 5. In this system, the robot is a simple 3 degree-of-freedom robot that resembles a plotter. This robot is mounted onto the touch screen display/control panel of a typical ventilator (here a Maquet Servo-U unit). The end-effector is a simple pen-like device with a tip whose contact with the Servo-U touch screen can be detected by the Servo-U unit. The "XY" portion of the robot positions the end-effector on the desired position relative to the touch screen display. The "Z" motion of the robot is provided by a simple actuator that moves the touch pen along its axis to touch or move back from the Servo-U touch screen. An LED is mounted on the end-effector of the robot to facilitate visual tracking by a video camera positioned to the side of the Servo-U control panel.

In this embodiment, the design has a two-axis gantry and a mechanized end-effector finger, with the ends of the horizontal axis being used to easily secure the robot to the desired screen using a clamp with a screw fixation. The vertical axis assembly is cantilevered on the horizontal axis and translates with it. A roller at the bottom of vertical axis engages the screen bezel and prevents unexpected touch interactions. The primary axes are driven by a pair of 45 Ncm NEMA 17 stepper motors via timing belts, while the end effector finger is driven by a compact servo. Control for the motors and servo is supplied by an Atmega328 microcontroller alongside A4988 stepper drivers.

The robot subsystem controller comprises two microcontrollers, as shown in FIG. 4. An Arduino microcontroller controls the robotic joints (XY robot and touch pen actuator) and the LED. A Raspberry Pi microcontroller running the Robot Operating System (ROS) [1, 2] is interfaced to the video camera and to the Arduino controller. It manages the wireless communication and command protocols with the remote controller.

The remote controller is currently implemented on a laptop computer with a touch screen display that can also be folded to provide a "tablet"-like user interface. This computer performs image dewarping to transform the oblique view produced by the video camera into a front-view live image on the remote controller display. In this embodiment, the user uses the touch screen display to select the desired position of the robot. After the robot moves the XY portion of the robot to the desired position, the user presses a separate "push" button on to the left of the live image display to tell the robot to actuate the pen-like end effector to touch the Servo-U's touch screen.

Figure 6:
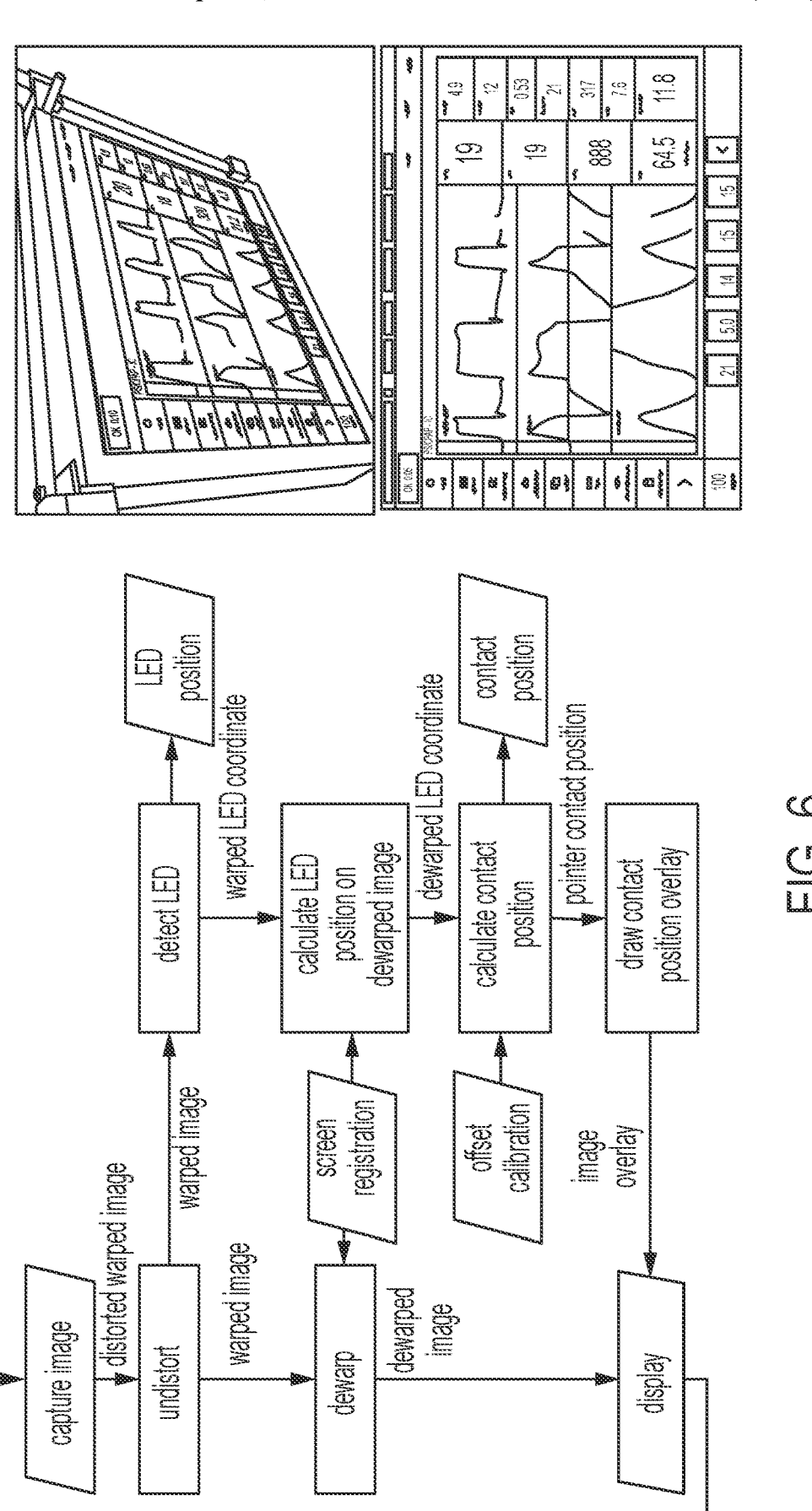
FIG. 6 shows an example of live image processing and display according to an embodiment of the current invention. (Left) Flow chart; (right) oblique view as seen by camera and dewarped image showing front-on view.

FIG. 6 shows the logic for live image processing and display, together with images illustrating the oblique view as seen by the camera and a dewarped image showing the corresponding "front-on" view. Dewarping is enabled by a screen registration method shown in FIG. 6 that detects the location of the ventilator's screen on the camera view and calculates the transformation that maps camera images to front-view (dewarped) images. The screen registration method is configurable to recognize multiple ventilator screen configurations by providing template images of typical screens of the device that is to be remotely operated.

REFERENCES

[1] M. Quigley, K. Conley, B. Gerkey, J. Faust, T. B. Foote, J. Leibs, R. Wheeler, and A. Y. Ng, "ROS: an open-source Robot Operating System", in ICRA Workshop on Open Source Software, May 12, 2009. p. 5.
[2]—, "The Robot Operating System (ROS)," https://www.ros.org/, 2020.

While various embodiments of the present invention have been described above, it should be understood that they have been presented by way of example only, and not limitation. Thus, the breadth and scope of the present invention should not be limited by any of the above-described illustrative embodiments, but should instead be defined only in accordance with the following claims and their equivalents.

The embodiments illustrated and discussed in this specification are intended only to teach those skilled in the art how to make and use the invention. In describing embodiments of the disclosure, specific terminology is employed for the sake of clarity. However, the disclosure is not intended to be limited to the specific terminology so selected. The above-described embodiments of the disclosure may be modified or varied, without departing from the invention, as appreciated by those skilled in the art in light of the above teachings. It is therefore to be understood that, within the scope of the claims and their equivalents, the invention may be practiced otherwise than as specifically described. For example, it is to be understood that the present disclosure contemplates that, to the extent possible, one or more features of any embodiment can be combined with one or more features of any other embodiment.

We claim:

1. A robotic system for remote operation of human-controllable equipment, comprising:
    a remotely operable robotic subsystem configured to be at least one of mounted on or arranged adjacent to said human-controllable equipment to be controlled through a user interface;
    a remote controller that is configured to be operated by a human;
    an imaging system configured to be at least one of mounted on or arranged adjacent to said human-controllable equipment to be able to obtain images of controls of said human-controllable equipment; and
    an image processing system configured to communicate with both said imaging system and said remote controller to receive said images and provide information to said remote controller,
    wherein said remote controller emulates a representation of said user interface of said human-controllable equipment on said remote controller such that a human can provide commands using said representation of said user interface on said remote controller,
    wherein said remotely operable robotic subsystem comprises an end-effector for operating a local touch-screen display in response to corresponding actions by a human on said remote controller,
    wherein there exists an offset between a detected end-effector position of said end-effector on said images and an actual position where said end-effector touches said local touch-screen display,
    wherein said remotely operable robotic subsystem uses an offset map to correct for said offset when moving said end-effector, and
    wherein said remotely operable robotic subsystem is configured to receive commands from said remote controller to thereby operate said human-controllable equipment.

2. The robotic system according to claim 1, wherein said imaging system comprises a camera, and
    wherein said image processing system is configured to at least one of undistort or dewarp images from said camera.

3. The robotic system according to claim 1, wherein at least one of said human-controllable equipment, said remotely operable robotic subsystem, or said imaging system is configured to communicate with said remote controller by a wireless connection.

4. The robotic system according to claim 1, wherein at least one of said human-controllable equipment, said remotely operable robotic subsystem, or said imaging system is configured to communicate with said remote controller by a wired connection.

5. The robotic system according to claim 1, wherein said human-controllable equipment comprises a local touch-screen display that is operable for human control of said human-controllable equipment,
    wherein said remote controller comprises a remote touch-screen display, wherein said image processing system provides information to said remote controller such that said remote touch-screen display corresponds to said local touch-screen display.

6. The robotic system according to claim 5, wherein said remotely operable robotic subsystem is configured to attach to said local touch-screen display, said remotely operable robotic subsystem comprising a positioning assembly that can position said end-effector proximate a selected position on said local touch-screen display such that actuation of said end-effector performs touch operation to said local touch-screen display.

7. The robotic system according to claim 1, wherein said human-controllable equipment comprises at least one of a local touch-screen display, a local button, or a local knob that is operable for human control of said human-controllable equipment, wherein said remote controller comprises a remote touch-screen display, wherein said image processing system provides information to said remote controller such that said at least one of a local touch-screen display, a local button, or a local knob corresponds to said local touch-screen display, and wherein said end-effector is configured for operating said at least one of a local touch-screen display, a local button, or a local knob in response to corresponding actions by a human on said remote touch-screen display.

8. The robotic system according to claim 1, wherein said human-controllable equipment is human-controllable equipment used in an intensive care medical environment.

9. The robotic system according to claim 8, wherein said remotely operable robotic subsystem is to be at least one of sterilized or reconfigured with new parts after removal of disposable parts.

10. The robotic system according to claim 1, wherein said human-controllable equipment is a respirator.

11. The robotic system according to claim 1, wherein said human-controllable equipment is a ventilator.

12. The robotic system according to claim 1, wherein said human-controllable equipment is an infusion pump.

13. A method for remote operation of human-controllable equipment, comprising:

at least one of mounting a remotely operable robotic subsystem on said human-controllable equipment or arranging said remotely operable robotic subsystem adjacent to said human-controllable equipment, said human-controllable equipment comprising a user interface; and providing a remote controller that is configured to be operated by a human, wherein said remote controller emulates a representation of said user interface of said human-controllable equipment such that a human can provide commands using said representation, wherein said remotely operable robotic subsystem is configured to receive commands from said remote controller to thereby operate said human-controllable equipment, wherein said remotely operable robotic subsystem comprises an imaging system configured to be at least one of mounted on or arranged adjacent to said human-controllable equipment to be able to obtain images of controls of said human-controllable equipment, wherein said remotely operable robotic subsystem comprises an image processing system configured to communicate with both said imaging system and said remote controller to receive said images and provide information to said remote controller, wherein said remotely operable robotic subsystem comprises an end-effector for operating a local touch-screen display in response to corresponding actions by a human on said remote controller, wherein there exists an offset between a detected end-effector position of said end-effector on said images and an actual position where said end-effector touches said local touch-screen display, wherein said remotely operable robotic subsystem uses an offset map to correct for said offset when moving said end-effector.

\* \* \* \* \*